United States Patent
Gil

(10) Patent No.: US 10,482,403 B2
(45) Date of Patent: Nov. 19, 2019

(54) METHODS AND SYSTEMS FOR DESIGNING OF TASKS FOR CROWDSOURCING

(71) Applicant: Conduent Business Services, LLC, Dallas, TX (US)

(72) Inventor: Alvaro E Gil, Rochester, NY (US)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 998 days.

(21) Appl. No.: 14/534,291

(22) Filed: Nov. 6, 2014

(65) Prior Publication Data

US 2016/0132827 A1    May 12, 2016

(51) Int. Cl.
*G06Q 10/00* (2012.01)
*G06Q 10/06* (2012.01)
*G06Q 10/10* (2012.01)

(52) U.S. Cl.
CPC ......... *G06Q 10/063* (2013.01); *G06Q 10/103* (2013.01); *G06Q 10/06* (2013.01)

(58) Field of Classification Search
CPC ...... G06Q 10/06; G06Q 10/04; G06Q 10/063; G06Q 10/06311; G06Q 10/0633; G06Q 10/06375; G06Q 10/0631; G06Q 10/063118; G06Q 10/06312; G06Q 10/103; G06Q 10/06313; G06Q 10/06316; G06Q 10/06315
See application file for complete search history.

(56) References Cited

U.S. PATENT DOCUMENTS

| | | | |
|---|---|---|---|
| 2005/0096950 A1* | 5/2005 | Caplan | G06Q 10/06314 705/7.24 |
| 2009/0099887 A1 | 4/2009 | Sklar et al. | |
| 2011/0295722 A1 | 12/2011 | Reisman | |
| 2012/0137367 A1* | 5/2012 | Dupont | G06F 21/00 726/25 |
| 2012/0245980 A1* | 9/2012 | Cook | G06Q 10/04 705/7.37 |
| 2014/0156334 A1* | 6/2014 | Meng | G06Q 10/06313 705/7.23 |

(Continued)

OTHER PUBLICATIONS

U.S. Appl. No. 14/225,475, filed Mar. 26, 2014, Gil et al, Methods and Systems for Modeling Crowdsourcing Platform.

(Continued)

*Primary Examiner* — William S Brockington, III
(74) *Attorney, Agent, or Firm* — Jones Robb, PLLC

(57) ABSTRACT

According to embodiments illustrated herein, a method is provided for designing an image-analysis task. The method includes receiving one or more first target values of one or more output parameters of the image-analysis task from a requester through a GUI. Thereafter, one or more first values of one or more input parameters, associated with the image-analysis task, corresponding to the one or more first target values are determined based on the one of more first target values and a model. The model corresponds to a relationship between the one or more input parameters and the one or more output parameters. Further, the one or more first values of the one or more input parameters are presented to the requester through the GUI. The requester at least provides one or more second target values of the one or more output parameters through the GUI, based on the presentation.

20 Claims, 9 Drawing Sheets

(56) References Cited

U.S. PATENT DOCUMENTS

2014/0278634 A1* 9/2014 Horvitz .......... G06Q 10/063112
　　　　　　　　　　　　　　　　　　　　705/7.14
2014/0289733 A1* 9/2014 Fritz ................... G06F 9/5066
　　　　　　　　　　　　　　　　　　　　718/104
2014/0298343 A1* 10/2014 Rajan ................. G06F 9/5027
　　　　　　　　　　　　　　　　　　　　718/102

OTHER PUBLICATIONS

Gao, Xi Alice et al—Quality Expectation-Variance Tradeoffs in Crowdsourcing Contests, pp. 1-7.

* cited by examiner

402

Specify Optimization Targets

| ☐ | Output parameters | Target values | Optimization direction |
|---|---|---|---|
| ☑ | ACCURACY (0-1) | 0.85 | Maximization |
| ☑ | COMPLETION TIME (seconds) | 525 | Minimization |
| ◯ | ACCEPTANCE RATE (0-1) | | Maximization / Minimization |

Specify Optimization Targets

| ☑ | Output parameters | Optimization direction |
|---|---|---|
| ☑ | ACCURACY | Maximization |
| ☑ | COMPLETION TIME | Minimization |
| ☑ | ACCEPTANCE RATE | Maximization |

Recommended input parameters for task design

| Input parameters | Recommended values |
|---|---|
| INCENTIVE (USD) | 0.15 |
| VIDEO SPEED (fps) | 16 |
| COUNTRY | US |
| TASK LIFETIME (hours) | 3.5 |
| ASSIGNMENT DURATION (hours) | 1.7 |

Specify Optimization Targets

| ☑ | Output parameters | Optimization target | Target values | Optimization direction |
|---|---|---|---|---|
| ☑ | ACCURACY (0-1) | ○ Value<br>☑ Mean<br>○ SD | -<br>0.90<br>- | -<br>Maximization<br>- |
| ☑ | COMPLETION TIME (seconds) | ○ Value<br>☑ Mean<br>○ SD | -<br>652<br>- | -<br>Minimization<br>- |
| ☑ | ACCEPTANCE RATE (0-1) | ☑ Value<br>○ Mean<br>○ SD | 0.78<br>-<br>- | Maximization<br>-<br>- |

Show Graphical Plot: ☑

METHODS AND SYSTEMS FOR DESIGNING OF TASKS FOR CROWDSOURCING

TECHNICAL FIELD

The presently disclosed embodiments are related, in general, to crowdsourcing. More particularly, the presently disclosed embodiments are related to methods and systems for designing of tasks for crowdsourcing.

BACKGROUND

With the advancement of telecommunication and the penetration of internet among the masses, crowdsourcing has emerged as an opportunity for various requesters including enterprises and individuals to outsource their tasks to loosely bound groups of workers, also called crowdworkers. The requesters may crowdsource various tasks such as tagging of videos/images, digitization of handwritten documents, generation of content, and so on, to the crowdworkers through one or more crowdsourcing platforms. The crowdworkers may then perform the tasks posted on the one or more crowdsourcing platforms. Performance of tasks by crowdworkers may depend on various factors related to a design/feature of the tasks. For example, various factors such as, but not limited to, incentives offered for the tasks, a country in which the task is posted, a lifetime of the task, a duration of assignment of the task, and so on, may affect the performance of the tasks by the crowdworkers. The requesters may want to favorably influence the performance of the tasks by designing the tasks in an optimum manner.

SUMMARY

According to embodiments illustrated herein, there is provided a system for designing an image-analysis task for crowdsourcing. The system includes one or more micro-processors configured to receive one or more first target values of one or more output parameters associated with the image-analysis task from a requester through a Graphical User Interface (GUI). Thereafter, one or more first values of one or more input parameters, associated with the image-analysis task, corresponding to the one or more first target values are determined based at least on the one of more first target values and a model. The model corresponds to a relationship between the one or more input parameters and the one or more output parameters. The one or more micro-processors are further configured to present the one or more first values of the one or more input parameters to the requester through the GUI. The requester at least provides one or more second target values of the one or more output parameters through the GUI, based on the presentation.

According to embodiments illustrated herein, there is provided a system for designing one or more tasks for crowdsourcing. The system includes one or more micro-processors configured to receive one or more first target values of one or more output parameters associated with the one or more tasks from a requester through a Graphical User Interface (GUI). The one or more micro-processors are further configured to present, to the requester, through the GUI, one or more first values of the one or more input parameters associated with the one or more tasks, corresponding to the one or more first target values. The one or more first values of the one or more input parameters are determined based at least on the one of more first target values and a model. The model corresponds to a relationship between the one or more input parameters and the one or more output parameters. Further, the requester at least provides one or more second target values of the one or more output parameters through the GUI, based on the presentation.

According to embodiments illustrated herein, there is provided a method for designing an image-analysis task for crowdsourcing. The method includes receiving, by one or more micro-processors, one or more first target values of one or more output parameters associated with the image-analysis task from a requester through a Graphical User Interface (GUI). Thereafter, the one or more micro-processors determine one or more first values of one or more input parameters, associated with the image-analysis task, corresponding to the one or more first target values based at least on the one of more first target values and a model. The model corresponds to a relationship between the one or more input parameters and the one or more output parameters. The method further includes presenting, by the one or more processors, the one or more first values of the one or more input parameters to the requester through the GUI. The requester at least provides one or more second target values of the one or more output parameters through the GUI, based on the presentation.

According to embodiments illustrated herein, there is provided a graphical user interface (GUI) for designing one or more tasks for crowdsourcing. The GUI comprises a user interface (UI) adapted to receive one or more first target values of one or more output parameters associated with the one or more tasks from a requester. The UI is further adapted to present, to the requester, one or more first values of the one or more input parameters associated with the one or more tasks, corresponding to the one or more first target values. The one or more first values of the one or more input parameters are determined based at least on the one of more first target values and a model. The model corresponds to a relationship between the one or more input parameters and the one or more output parameters. Further, the requester at least provides one or more second target values of the one or more output parameters, based on the presentation.

According to embodiments illustrated herein, there is provided a method for designing one or more tasks for crowdsourcing. The method includes determining, by one or more micro-processors, one or more first target values of one or more output parameters associated with the one or more tasks based on a model. The model corresponds to a relationship between one or more input parameters associated with the one or more tasks and the one or more output parameters. Further, the method includes determining, by in one or more micro-processors, one or more first values of the one or more input parameters, corresponding to the one or more first target values, based at least on the one of more first target values and the model. Thereafter, the one or more first values of the one or more input parameters are presented to the requester within a graphical plot through a Graphical User Interface (GUI), wherein the graphical plot corresponds to at least one of a Pareto Front plot or a Parallel co-ordinates plot. The requester at least provides one or more second target values of the one or more output parameters through the GUI, based on the presentation.

According to embodiments illustrated herein, there is provided a computer program product for use with a computer. The computer program product includes a non-transitory computer readable medium. The non-transitory computer readable medium stores a computer program code for designing an image-analysis task for crowdsourcing. The computer program code is executable by one or more micro-processors to receive one or more first target values of one or more output parameters associated with the image-analysis task from a requester through a Graphical User Interface (GUI). Thereafter, one or more first values of one or more input parameters, associated with the image-analysis task, corresponding to the one or more first target values are determined based at least on the one of more first target values and a model. The model corresponds to a relationship between the one or more input parameters and the one or more output parameters. The computer program code is further executable by the one or more processors to present the one or more first values of the one or more input parameters to the requester through the GUI. The requester at least provides one or more second target values of the one or more output parameters through the GUI, based on the presentation.

According to embodiments illustrated herein, there is provided a computer program product for use with a computer. The computer program product includes a non-transitory computer readable medium. The non-transitory computer readable medium stores a computer program code for designing one or more tasks for crowdsourcing. The computer program code is executable by one or more micro-processors to receive one or more first target values of one or more output parameters associated with the one or more tasks from a requester through a Graphical User Interface (GUI). The computer program code is further executable by the one or more micro-processors to present, to the requester, through the GUI, one or more first values of the one or more input parameters associated with the one or more tasks, corresponding to the one or more first target values. The one or more first values of the one or more input parameters are determined based at least on the one of more first target values and a model. The model corresponds to a relationship between the one or more input parameters and the one or more output parameters. Further, the requester at least provides one or more second target values of the one or more output parameters through the GUI, based on the presentation.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIGS. 4A, 4B, 4C, 4D, 4E, 4F, and 4G illustrate examples of the user interfaces presented on a requester's computing device for designing one or more tasks for crowdsourcing, in accordance with at least one embodiment.

DETAILED DESCRIPTION

Figure 1:
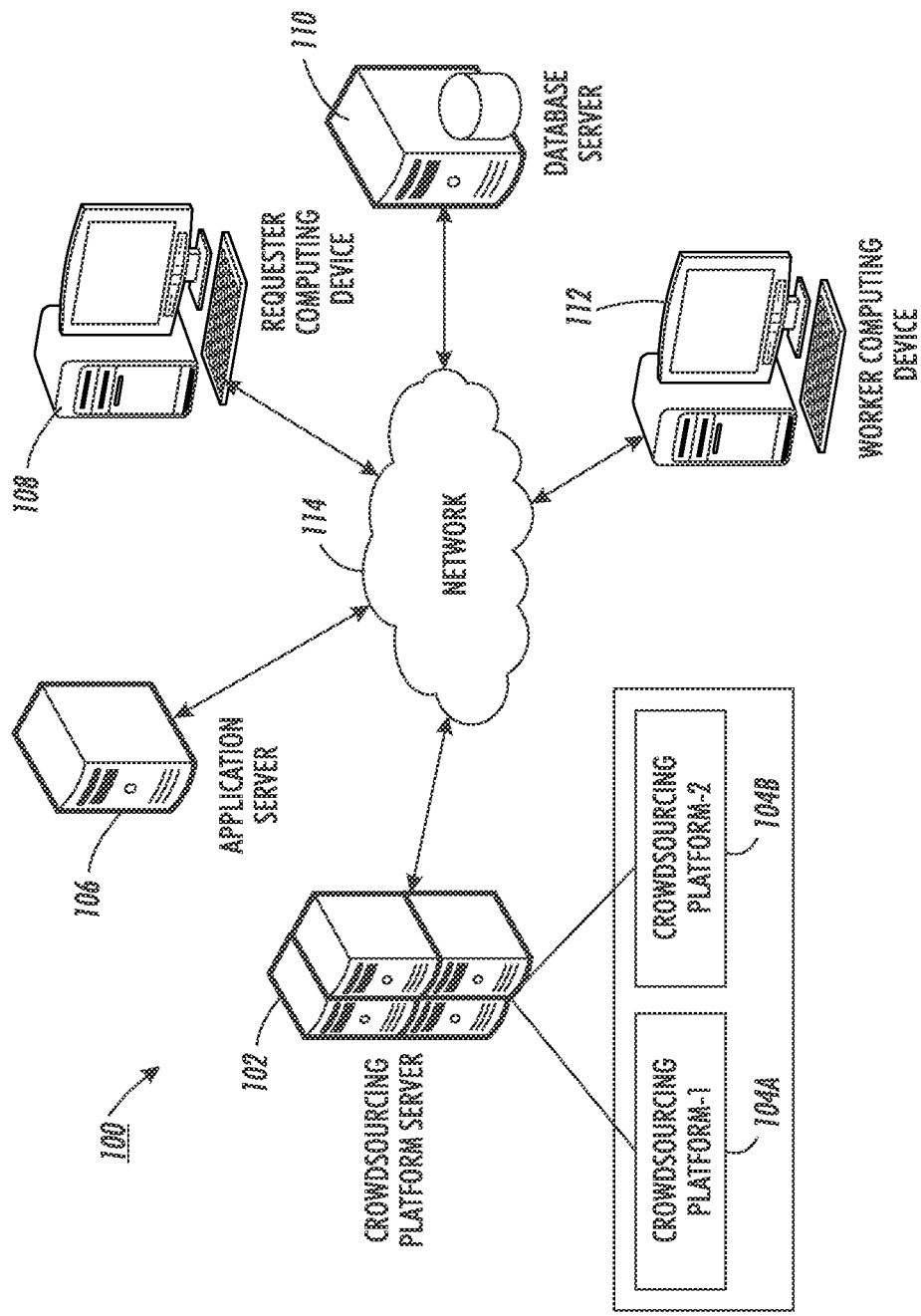
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

DEFINITIONS

The following terms shall have, for the purposes of this application, the respective meanings set forth below.

"Crowdsourcing" refers to distributing tasks (hereinafter, also referred to as crowdsourcing tasks) by soliciting the participation of loosely defined groups of individual crowd-workers. A group of crowdworkers may include, for example, individuals responding to a solicitation posted on a certain website such as, but not limited to, Amazon Mechanical Turk, Crowd Flower, or Mobile Works.

A "crowdsourcing platform" refers to a business application, wherein a broad, loosely defined external group of people, communities, or organizations provide solutions as outputs for any specific business processes received by the application as inputs. In an embodiment, the business application may be hosted online on a web portal (e.g., crowdsourcing platform servers). Examples of the crowdsourcing platforms include, but are not limited to, Amazon Mechanical Turk, Crowd Flower, or Mobile Works.

A "crowdworker" refers to a workforce/worker(s) who may perform one or more tasks that generate data that contributes to a defined result. With reference to the present disclosure, the crowdworker(s) includes, but is not limited to, a satellite center employee, a rural business process outsourcing (BPO) firm employee, a home-based employee, or an internet-based employee. Hereinafter, the terms "crowdworker", "worker", "remote worker", "crowdsourced workforce", and "crowd" may be used interchangeably.

A "crowdsourcing task" refers to a piece of work, an activity, an action, a job, an instruction, or an assignment to be performed. Crowdsourcing tasks may necessitate the involvement of one or more workers. Examples of tasks may include, but are not limited to, an image/video/text labelling/tagging/categorization, language translation, data entry, handwriting recognition, product description writing, product review writing, essay writing, address look-up, website look-up, hyperlink testing, survey completion, consumer feedback, identifying/removing vulgar/illegal content, duplicate checking, problem solving, user testing, video/audio transcription, targeted photography (e.g. of product placement), text/image analysis, directory compilation, or information search/retrieval.

"Input parameters" refer to one or more parameters corresponding to at least one of a crowdsourcing platform, a crowdworker, crowdsourcing tasks, or a requester. Examples of the input parameters may include, but are not limited to, an incentive associated with the tasks, a country in which the tasks are attempted, a lifetime of the tasks, a time available to complete the tasks, days of a week on which the tasks are attempted, time of the days when tasks are attempted, recurrence of the tasks, skill set associated with crowdworkers, availability of the crowdworkers, motivation of the crowdworkers, intentions of the crowdworkers in performing the tasks, and difficulty levels of the tasks. In a scenario, where the crowdsourcing tasks correspond to video tagging, the input parameters may also include at least one of playback speed associated with the audio/video clips included in the tasks, duration of the audio/video clips included in the tasks, or a resolution of the videos included in the tasks.

"Output parameters" refer to one or more parameters that are indicative of performance of one or more crowdsourcing tasks. In an embodiment, the output parameters may include, but are not limited to, task accuracy, task completion time, or task acceptance rate.

"One or more design of experiments" refer to statistical methods that are utilized to determine combinations of values of the one or more input parameters. Such combinations of the values of the input parameters govern the variations in the output parameters. In an embodiment, the values of the input parameters may be determined using one or more techniques such as, but are not limited to, Full Factorial Method, Central Composite Design method, Pseudo-Monte Carlo Sampling method, Latin Hypercube Sampling method, Orthogonal Array Sampling method, and so forth.

A "budget constraint" refers to a limit associated with a maximum number of samples of the one or more input parameters that may be chosen to record observations of the one or more output parameters. In an embodiment, the budget constraint may correspond to a number and a combination of the one or more input parameters to be considered for the creation of a model. For example, a requester specifies the value of the budget constraint as five. Thus, in this scenario, five samples of input parameters may be taken for recording observations of the output parameters and subsequent creation of the model. For instance, if there are two combinations of input parameters, then the first combination may be sampled three times, and the second combination of input parameters may be sampled two times, or vice versa. Thus, the sum of the number of samples of input parameter combinations considered for creation of the model is equal to the budget constraint (which is equal to five in the above example). A person skilled in the art would appreciate that any other sampling of the combinations of input parameters may be possible subject to the condition that the sum of the samples of the input parameter combinations, so considered, equal the value of the budget constraint.

A "model" refers to a mathematical relationship between the one or more input parameters and the one or more output parameters such that values/distributions of the one or more output parameters may be obtainable from the model by supplying values of the one or more input parameters. In an embodiment, the model may correspond to a deterministic model or a statistical model. Examples of the model may include, but are not limited to, a regression model, an agent-based model, an Exponential Distribution, an Extreme Value Distribution, a Normal Distribution, a Lognormal Distribution, an F-Distribution, a Rayleigh Distribution, a Beta Distribution, a Gamma Distribution, or a Wiebull Distribution.

A "Pareto Optimization" refers to a mathematical technique of obtaining one or more solutions to a multi-objective optimization problem that has two or more competing objectives. The one or more solutions obtained using the technique are referred to as non-dominant solutions or optimal solutions when changing a particular solution leads to a degradation/loss in at least one of the objectives. Such non-dominant solutions are also termed Pareto Front solutions.

FIG. 1 is a block diagram of a system environment 100, in which various embodiments can be implemented. The system environment 100 includes a crowdsourcing platform server 102, an application server 106, a requester-computing device 108, a database server 110, a worker-computing device 112, and a network 114.

In an embodiment, the crowdsourcing platform server 102 is configured to host one or more crowdsourcing platforms (e.g., a crowdsourcing platform-1 104a and a crowdsourcing platform-2 104b). One or more workers are registered with the one or more crowdsourcing platforms. Further, the crowdsourcing platform (such as the crowdsourcing platform-1 104a or the crowdsourcing platform-2 104b) may crowdsource one or more tasks by offering the one or more tasks to the one or more workers. In an embodiment, the crowdsourcing platform (e.g., 104a) presents a user interface to the one or more workers through a web-based interface or a client application. The one or more workers may access the one or more tasks through the web-based interface or the client application. Further, the one or more workers may submit a response to the crowdsourcing platform (i.e., 104a) through the user interface.

A person skilled in the art would understand that though FIG. 1 illustrates the crowdsourcing platform server 102 as hosting only two crowdsourcing platforms (i.e., the crowdsourcing platform-1 104a and the crowdsourcing platform-2 104b), the crowdsourcing platform server 102 may host more than two crowdsourcing platforms without departing from the spirit of the disclosure. Alternatively, the crowdsourcing platform server 102 may host a single crowdsourcing platform.

In an embodiment, the crowdsourcing platform server 102 may be realized through an application server such as, but not limited to, a Java application server, a .NET framework, and a Base4 application server.

In an embodiment, the application server 106 may include programs/modules/computer executable instructions that may be representative of a model that associates one or more input parameters with one or more output parameters, where each of the input and output parameters is associated with the one or more crowdsourcing tasks. In an embodiment, the model may be determined from an analysis of historical data pertaining to performance of tasks on the crowdsourcing platform, for example, 104a. Further, in an embodiment, the application server 106 may receive one or more first target values of at least one of the one or more output parameters from a requester. Thereafter, in an embodiment, the application server 106 may determine one or more first values for the one or more input parameters that may lead to achieving the one or more first target values. In an embodiment, the application server 106 may utilize the model to determine the one or more first values. In an embodiment, the one or more first values are presented to the requester within a graphical plot. In an embodiment, the graphical plot may correspond to at least one of a Pareto Front plot or a parallel coordinates plot. If the requester accepts the one or more first values, one or more tasks submitted by the requester may be crowdsourced through the crowdsourcing platform, as per the first values. However, in case the requester does not accept the one or more first values, the application server 106 may receive one or more second target values of the one or more output parameters from the requester. Based on the one or more second target values, one or more second values may be determined for the one or more input parameters, in a similar manner. An embodiment of a method for designing one or more tasks for crowdsourcing has been explained further in conjunction with FIG. 3.

Some examples of the application server 106 may include, but are not limited to, a Java application server, a .NET framework, and a Base4 application server.

A person with ordinary skill in the art would understand that the scope of the disclosure is not limited to illustrating the application server 106 as a separate entity. In an embodiment, the functionality of the application server 106 may be implementable on/integrated with the crowdsourcing platform server 102.

Further, a person skilled in the art would appreciate that the model may be updated periodically based on an updating of the historical data related to the performance of tasks on the crowdsourcing platform, for example, 104*a*.

The requester-computing device 108 is a computing device used by a requester to upload information pertaining to the one or more tasks. In an embodiment, the requester may send the one or more tasks to the application server 106. For example, if the one or more tasks correspond to digitization of handwritten documents, the requester may upload electronic documents (e.g., scanned copies of the handwritten document) on the application server 106. Similarly, if the one or more tasks correspond to video tagging, the requester may upload the respective videos. Further, the requester may provide the one or more first target values of the one or more output parameters though a GUI (Graphical User Interface) of the requester-computing device 108. In an embodiment, the requester may be presented with the graphical plot displaying the one or more first values for the one or more input parameters through the GUI. In an embodiment, the graphical plot may correspond to at least one of a Pareto Front plot or a Parallel Coordinates plot. Thereafter, the requester may accept or reject the one or more first values. Based on the requester's acceptance, the one or more tasks may be crowdsourced according to the one or more first values of the input parameters. Alternatively, the requester may provide the one or more second target values for the one or more output parameters. Examples of GUIs that may be presented to the requester have been illustrated in FIGS. 4A, 4B, 4C, 4D, 4E, 4F, and 4G. Examples of the requester-computing device 108 include, but are not limited to, a personal computer, a laptop, a personal digital assistant (PDA), a mobile device, a tablet, or any other computing device.

In an embodiment, the database server 110 is configured to store the one or more tasks and respective information associated with the one or more tasks. In an embodiment, the database server 110 may receive a query from the crowdsourcing platform server 102 and/or the application server 106 to access/extract at least one of the one or more tasks or the model from the database server 110. The database server 110 may be realized through various technologies such as, but not limited to, Microsoft® SQL Server, Oracle, and My SQL. In an embodiment, the crowdsourcing platform server 102 and/or the application server 106 may connect to the database server 110 using one or more protocols such as, but not limited to, Open Database Connectivity (ODBC) protocol and Java Database Connectivity (JDBC) protocol.

A person with ordinary skills in the art would understand that the scope of the disclosure is not limited to the database server 110 as a separate entity. In an embodiment, the functionalities of the database server 110 can be integrated into the crowdsourcing platform server 102 and/or the application server 106.

The worker-computing device 112 is a computing device used by a crowdworker. The worker-computing device 112 is configured to present the user interface (received from the crowdsourcing platform, e.g., 104*a*) to the worker. The worker receives the one or more tasks from the crowdsourcing platform (i.e., 104*a*) through the user interface. Thereafter, the worker submits the responses for the one or more tasks through the user interface to the crowdsourcing platform (i.e., 104*a*). Examples of the worker-computing device 112 include, but are not limited to, a personal computer, a laptop, a personal digital assistant (PDA), a mobile device, a tablet, or any other computing device.

The network 114 corresponds to a medium through which content and messages flow between various devices of the system environment 100 (e.g., the crowdsourcing platform server 102, the application server 106, the requester-computing device 108, the database server 110, and the worker-computing device 112). Examples of the network 114 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 114 in accordance with various wired and wireless communication protocols such as Transmission Control Protocol and Internet Protocol (TCP/IP), User Datagram Protocol (UDP), and 2G, 3G, or 4G communication protocols.

Figure 2:
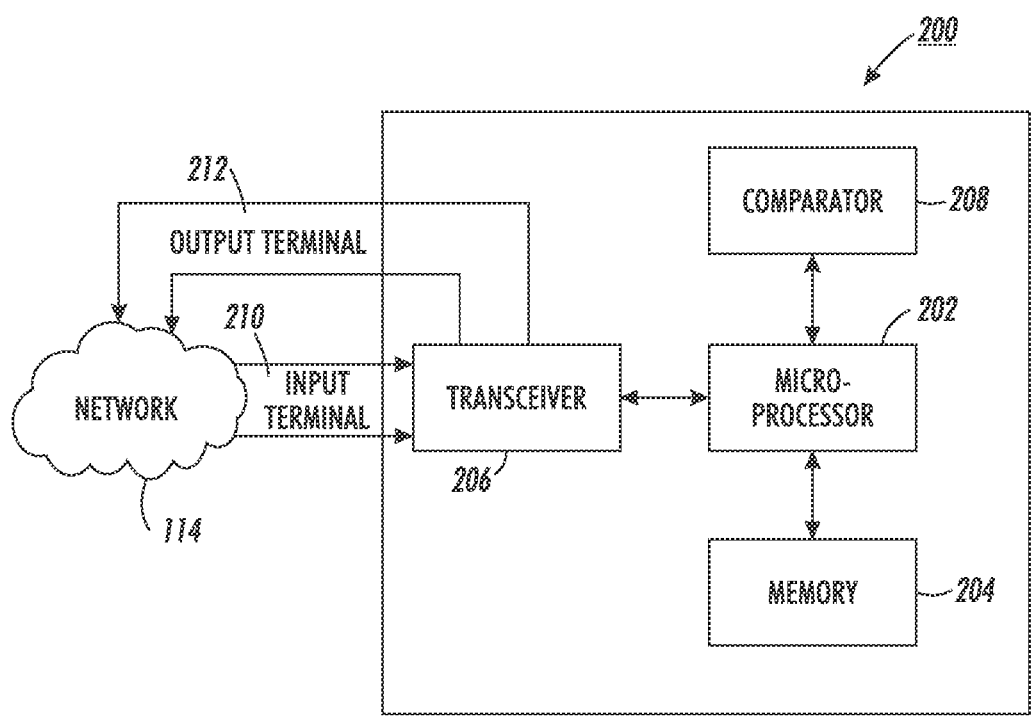
FIG. 2 is a block diagram that illustrates a system for designing one or more tasks for crowdsourcing, in accordance with at least one embodiment.

FIG. 2 is a block diagram that illustrates a system 200 for designing one or more tasks for crowdsourcing, in accordance with at least one embodiment. In an embodiment, the system 200 may correspond to the crowdsourcing platform server 102, the application server 106, or the requester-computing device 108. For the purpose of ongoing description, the system 200 is considered as the application server 106. However, the scope of the disclosure should not be limited to the system 200 as the application server 106. In an embodiment, the system 200 can also be realized as the crowdsourcing platform server 102 or the requester-computing device 108 without departing from the spirit of the disclosure.

The system 200 includes a micro-processor 202, a memory 204, a transceiver 206, and a comparator 208. The micro-processor 202 is coupled to the memory 204, the transceiver 206, and the comparator 208. The transceiver 206 is connected to the network 114 through an input terminal 210 and an output terminal 212.

The micro-processor 202 includes suitable logic, circuitry, and/or interfaces that are operable to execute one or more instructions stored in the memory 204 to perform predetermined operations. The micro-processor 202 may be implemented using one or more processor technologies known in the art. Examples of the micro-processor 202 include, but are not limited to, an x86 processor, an ARM processor, a Reduced Instruction Set Computing (RISC) processor, an Application Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the micro-processor 202 to perform specific operations. It is apparent to a person with ordinary skills in the art that the one or more instructions stored in the memory 204 enable the hardware of the system 200 to perform the predetermined operations.

The transceiver 206 transmits and receives messages and data to/from various components of the system environment 100 (e.g., the crowdsourcing platform server 102, the requester-computing device 108, the database server 110, and the worker-computing device 112) over the network 114. In an embodiment, the transceiver 206 is coupled to the input terminal 210 and the output terminal 212 through which the transceiver 206 may receive and transmit data/messages, respectively. Examples of the transceiver 206 may include, but are not limited to, an antenna, an Ethernet port, a USB port, or any other port that can be configured to receive and transmit data. The transceiver 206 transmits and receives data/messages in accordance with the various communication protocols, such as, TCP/IP, UDP, and 2G, 3G, or 4G communication protocols.

The comparator 208 is configured to compare at least two input signals to generate an output signal. In an embodiment, the output signal may correspond to either '1' or '0'. In an embodiment, the comparator 208 may generate output '1' if the value of a first signal (from the at least two signals) is greater than a value of the second signal (from the at least two signals). Similarly, the comparator 208 may generate an output '0' if the value of the first signal is less than the value of the second signal. In an embodiment, the comparator 208 may be realized through either software technologies or hardware technologies known in the art. Though, the comparator 208 is depicted as independent from the microprocessor 202 in FIG. 2, a person skilled in the art would appreciate the comparator 208 may be implemented within the micro-processor 202 without departing from the scope of the disclosure.

In an embodiment, where the system 200 corresponds to the requester-computing device 108, the system 200 may further include a display device. The display device may be interfaced with the micro-processor 202 through a display driver. In an embodiment, the display driver may include hardware/software that converts data to be displayed on the display device into appropriate signals acceptable by the display device.

Figure 3:
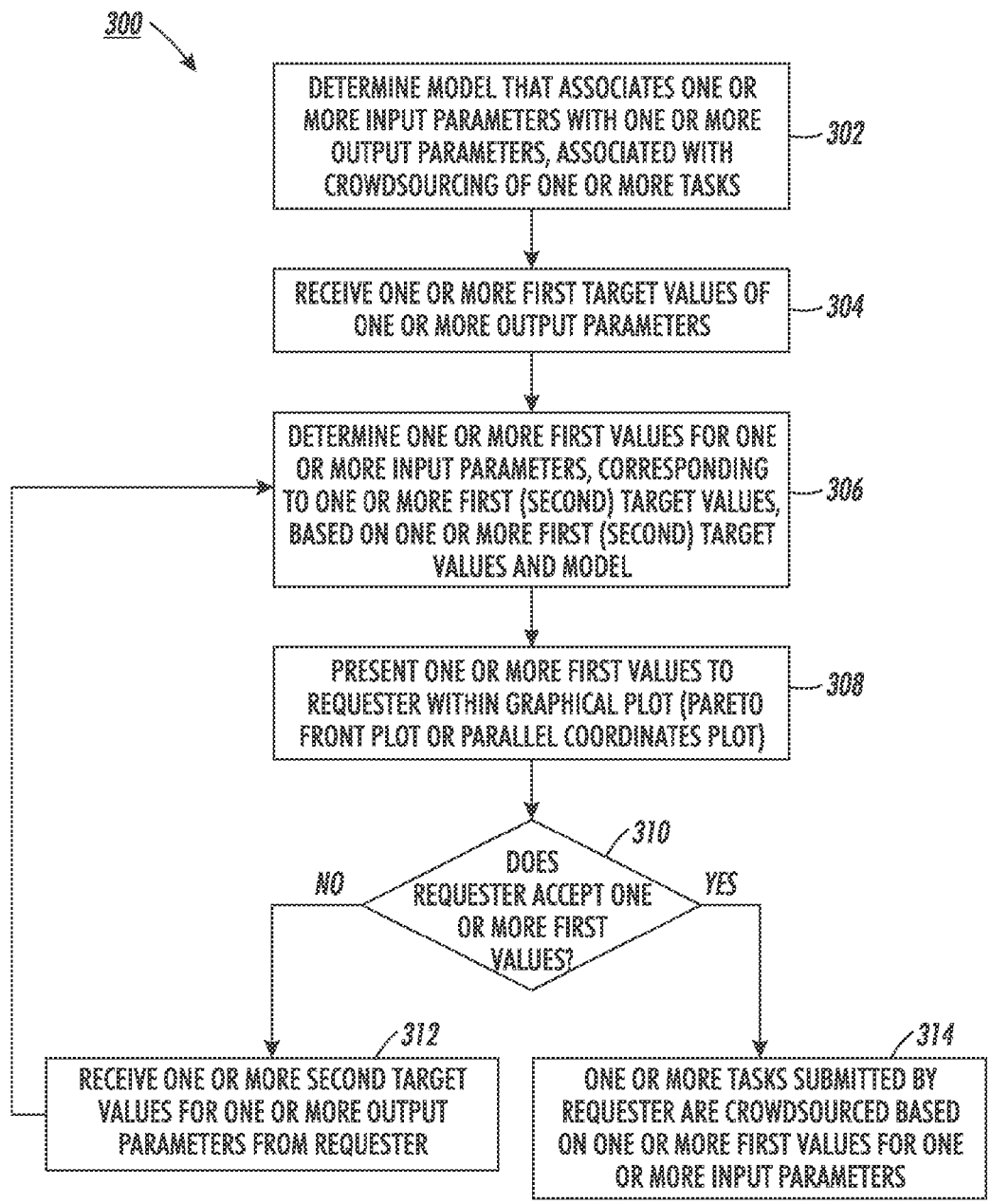
FIG. 3 is a flowchart illustrating a method for designing one or more tasks for crowdsourcing, in accordance with at least one embodiment.

The operation of the system 200 for designing one or more tasks for crowdsourcing has been described in conjunction with FIG. 3.

FIG. 3 is a flowchart 300 illustrating a method for designing one or more tasks for crowdsourcing, in accordance with at least one embodiment. The flowchart 300 is described in conjunction with FIG. 1 and FIG. 2.

At step 302, the model, which associates the one or more input parameters with the one or more output parameters, is created. In an embodiment, the micro-processor 202 is configured to create the model. In an embodiment, the model may be determined based on the historical data associated with performance of tasks on the crowdsourcing platform, for example, 104a.

In an embodiment, the model is representative of a relationship of the one or more input parameters with the one or more output parameters. In an embodiment, the input parameters may include, but are not limited to, an incentive associated with the tasks, a country in which the tasks are attempted, a lifetime of the tasks, a time available to complete the tasks, days of a week on which the tasks are attempted, time of the days when tasks are attempted, recurrence of the tasks, skill set associated with crowdworkers, availability of the crowdworkers, motivation of the crowdworkers, intentions of the crowdworkers in performing the tasks, and difficulty levels of the tasks. In a scenario, where the tasks correspond to video tagging, the input parameters may also include at least one of playback speed associated with the audio/video clips included in the tasks, duration of the audio/video clips included in the tasks, or a resolution of the videos included in the tasks. Examples of the one or more output parameters may include, but are not limited to, a task accuracy, a task completion time, and a task acceptance rate.

In an embodiment, for creating the model, the micro-processor 202 may receive a budget constraint associated with a maximum number of samples of the one or more input parameters that may be chosen to record observations of the one or more output parameters from the requester-computing device 108 of the requester. In an embodiment, the budget constraint may be deterministic of a number and a combination of input parameters to be considered for observing the values of the output parameters. Thus, based on the budget constraint, the micro-processor 202 may select a combination of the one or more input parameters for determining the model. For example, a budget constraint of 16*25, i.e., 400, may be received from the requester. The micro-processor 202 may design a five factorial design experiment for sampling of the input parameters of a video analysis task. As the budget constraint is 400, the micro-processor 202 may choose 16 combinations of the input parameters, and record 25 observations of the output parameters of the video analysis task, for each such combination of the input parameters. The micro-processor 202 may store the values of the output parameters recorded for each combination of the input parameters in the database server 110. The following table illustrates an example of the one or more input parameters and the various combinations of the values of the one or more input parameters for a video analysis task:

TABLE 1

Example of various combinations of values of the one or more input parameters for a video analysis task

| Sr. No. | Incentive (USD) | Video Speed (fps) | Country (US = 1; India = −1) | Task Lifetime (hours) | Assignment Duration (hours) |
|---|---|---|---|---|---|
| 1 | 0.1 | 16 | −1 | 3 | 12 |
| 2 | 0.1 | 16 | −1 | 36 | 1 |
| 3 | 0.1 | 16 | 1 | 3 | 1 |
| 4 | 0.1 | 16 | 1 | 36 | 12 |
| 5 | 0.1 | 32 | −1 | 3 | 1 |
| 6 | 0.1 | 32 | −1 | 36 | 12 |
| 7 | 0.1 | 32 | 1 | 3 | 12 |
| 8 | 0.1 | 32 | 1 | 36 | 1 |
| 9 | 1 | 16 | −1 | 3 | 1 |
| 10 | 1 | 16 | −1 | 36 | 12 |

TABLE 1-continued

Example of various combinations of values of the one or more input parameters for a video analysis task

| Sr. No. | Incentive (USD) | Video Speed (fps) | Country (US = 1; India = −1) | Task Lifetime (hours) | Assignment Duration (hours) |
|---------|-----------------|-------------------|------------------------------|-----------------------|-----------------------------|
| 11 | 1 | 16 | 1 | 3 | 12 |
| 12 | 1 | 16 | 1 | 36 | 1 |
| 13 | 1 | 32 | −1 | 3 | 12 |
| 14 | 1 | 32 | −1 | 36 | 1 |
| 15 | 1 | 32 | 1 | 3 | 1 |
| 16 | 1 | 32 | 1 | 36 | 12 |

As illustrated in Table 1, each row illustrates a combination of the input parameters for a video analysis task such as task incentive, video speed, country in which the task is posted, task lifetime, and assignment duration. In an embodiment, a Full Factorial method may be utilized for the design of experiment. The Full Factorial method may determine a number of observations needed for each combination of values of the input parameters. Further, as discussed above, the budget constraint may limit the total number of observations of the output parameters that may be recorded for all combinations of the input parameters. For the first row, (i.e., the combination 0.1, 16, −1, 3, and 12), the micro-processor 202 may observe 25 values of the output parameters, for example, task accuracy, task completion time, and task acceptance rate. Similarly, the micro-processor 202 may observe 25 values of the output parameters for each of the remaining combinations of input parameters, illustrated in rows 2-16 of Table 1. Based on such values of the output parameters so observed, the micro-processor 202 may determine the model.

A person skilled in the art would appreciate that the scope of the disclosure should not be limited to recording 25 observations per combination of input parameters, as the number 25 is provided for illustrative purpose only. Further, other design of experiment methods may be utilized to determine the model based on the budget constraint received from the requester.

Based on the observation of the output parameters for each combination of the input parameters the model is created. U.S. patent application Ser. No. 14/225,475 filed on Mar. 26, 2014, and assigned to the same assignee (Xerox Corporation), and which is herein incorporated by reference, discloses methods and systems for creation of the model. In an embodiment, the micro-processor 202 may utilize the method disclosed in the aforementioned patent application for creation of the model.

A person skilled in the art would appreciate that the model may correspond to a deterministic model or a statistical model. Examples of the model may include, but are not limited to, a regression model, an agent-based model, an Exponential Distribution, an Extreme Value Distribution, a Normal Distribution, a Lognormal Distribution, an F-Distribution, a Rayleigh Distribution, a Beta Distribution, a Gamma Distribution, or a Wiebull Distribution.

At step 304, the one or more first target values of the one or more output parameters are received. In an embodiment, the micro-processor 202 is configured to receive the one or more first target values of the one or more output parameters from the requester-computing device 108 through the transceiver 206. In an embodiment, the requester may provide the one or more first target values through the user-interface of the requester-computing device 108. For example, through the GUI of the requester-computing device 108, the requester may provide the target values of the output parameters such as task accuracy, task completion time, and task acceptance rate as 0.85 (or 85%), 500 seconds, and 0.80 (or 80%), respectively. Further, the requester may wish to maximize the mean of "task accuracy" and the "task acceptance rate", while simultaneously minimizing the mean of "task completion time". FIGS. 4A, 4D, and 4F illustrate examples of the GUIs that may be presented to the requester to receive the one or more first target values.

In an alternate embodiment, the one or more first target values may be determined from the model. For example, the requester may not know target values for the one or more output parameters. However, the requester may be able to specify which of the one or more output parameters are to be maximized and which are to be minimized. Based on such input from the requester, the micro-processor 202 may determine a corresponding maximum or minimum value of the respective output parameter from the model. Such values may be then used as the one or more target values of the one or more output parameters. For instance, the requester specifies that the output parameters "task accuracy" and "task acceptance rate" be maximized, while the output parameter "task completion time" be minimized. Based on the model, the micro-processor 202 may determine the maximum values of the output parameters "task accuracy" and "task acceptance rate" as 0.87 (or 87%) and 0.75 (75%) respectively. Further, using the model, the micro-processor 202 may determine the minimum value of the output parameter "task completion time" as 460 seconds. Accordingly, the micro-processor 202 may determine the one or more first target values as 0.87 (or 87%), 460 seconds, and 0.75 (75%) for the output parameters "task accuracy", "task completion time", and "task acceptance rate", respectively. FIG. 4B illustrates an example of the GUI that may be presented to the requester to receive inputs identifying which output parameters are to be maximized and which are to be minimized.

In an embodiment, the micro-processor 202 may determine an objective function for the one or more output parameters based on the one or more first target values. For example, the micro-processor 202 may determine the objective function as:

$$\text{Find } x^* = (\text{incentive, video speed, country, lifetime of task,} \quad (1)$$
$$\text{assignment duration) such that function } J(x) =$$
$$\left[ \text{mean (ln accuracy)), acceptance rate, } \frac{1}{\text{mean (ln (completion time))}} \right]$$
$$\text{is maximized}$$

The above equation illustrates that the objective function J(x) needs to be maximized subject to the constraints that mean of a lognormal distribution of accuracy and inverse of mean of a lognormal distribution of completion time be maximized. The purpose of the optimization problem is to obtain the values of the input parameters that maximize the objective function J(x), where the input parameters include parameters such as task incentive, video speed, country in which the task is posted, lifetime of the task, and duration of assignment of the tasks.

A person skilled in the art would appreciate that the scope of the disclosure is not limited to the example of the objective function, as provided above. The example of the objective function is provided for illustrative purpose only.

At step 306, one or more first values for one or more input parameters that may result in achieving the one or more first target values are determined. In an embodiment, the micro-processor 202 is configured to determine the one or more first values for the input parameters based on the model and the one or more first target values. In an embodiment, the micro-processor 202 may utilize a Pareto optimization technique to determine the first values for the one or more input parameters. Using Pareto optimization, a set of optimum values of the one or more input parameters may be obtained for the objective function of the one or more output parameters. The set of optimum values are such that optimizing the objective function further on one of the output parameters may result in loss/degradation in the optimization of the objective function on other output parameter. Such set of optimum values of the one or more input parameters are also referred as Pareto optimal solutions, Pareto Front solutions, or non-dominant solutions of the objective function of the one or more output parameters. For example, if the objective function of equation 1 is optimized further for the mean of lognormal distribution of accuracy, an existing Pareto optimal solution has a decrease in optimization in the inverse of the mean of lognormal distribution of completion time, and vice versa.

Post determining the set of Pareto optimal values of the one or more input parameters, the micro-processor 202 may utilize the model to determine the values of one or more sets of the output parameters that may be obtained when the tasks are crowdsourced based on each value of the one or more input parameters in the set of Pareto optimal values. For example, if the values of a set of Pareto optimal input parameters are 0.1 (for task incentive), 16 (for video speed), US (for country), 36 (for task lifetime), 12 (for assignment duration), based on the model, the micro-processor 202 may determine the values of the corresponding set of output parameters task accuracy and task completion time as 0.76 and 624 seconds, respectively.

The micro-processor 202 may further determine a weighted distance of the one or more first target values (provided by the requester) from each set of values of the one or more output parameters obtained by Pareto optimization. Thereafter, the micro-processor 202 selects the one or more first values of the input parameters as the Pareto optimal input parameters whose corresponding output parameters are at the least weighted distance or at a predetermined weighted distance from one or more first target values. In an embodiment, the requester may provide the predetermined weighted distance through the user-interface of the requester-computing device 108. Alternatively, the micro-processor 202 may determine the predetermined weighted distance heuristically. Thereafter, in an embodiment, the one or more first values of the input parameters, so selected, may be presented to the requester on the requester-computing device 108.

For example, three Pareto optimal solutions of input parameters are obtained based on Pareto optimization of the objective function of the one or more output parameters. The first set of output parameters corresponding to the first Pareto optimal solution is (0.80, 0.72, 0.67) for the output parameters "task accuracy", "task completion time (in hours)", and "task acceptance rate", respectively. Further, the second and the third sets of output parameters corresponding to the second and the third Pareto optimal solutions are (0.65, 0.57, 0.56) and (0.70, 0.61, 0.63) for the output parameters "task accuracy", "task completion time (in hours)", and "task acceptance rate", respectively. Considering that, the requester specifies the one or more first target values as (0.75, 0.60, 0.68) for output parameters "task accuracy", "task completion time (in hours)", and "task acceptance rate", respectively. The micro-processor 202 determines a weighted distance of each of the three sets of output parameters obtained from Pareto optimization using the following equation:

$$d = \sqrt{(S1-T1)^2 \cdot w1 + (S2-T2)^2 \cdot w2 + (S3-T3)^2 \cdot w3} \quad (2)$$

where,
d: weighted distance;
$S_i$: value of $i^{th}$ output parameter obtained from Pareto optimization;
$T_i$: first target value of $i^{th}$ output parameter;
$w_i$: weight assigned to $i^{th}$ output parameter, such that $$0 < w_i < 1 \text{ and } \Sigma_i w_i = 1 \quad (3)$$

Considering equal weightage (i.e., 0.33) is assigned to each output parameter, the weighted distance may be determined as 0.075, 0.092, and 0.040 for the first, the second, and the third set of output parameters. Thus, as the third set of output parameters is at the closest weighted distance from the one or more first target values of output parameters (i.e., 0.040), the micro-processor 202 may select the one or more input parameters associated with the third set of output parameters as the one or more first values of the input parameters.

A person skilled in the art would appreciate that the scope of the disclosure is not limited to determining the one or more first values by utilizing a Pareto Optimization technique. In an embodiment, the one or more first values may be determined by utilizing one or more machine learning techniques such as, but not limited to, one or more active learning techniques, one or more reinforcement learning techniques, or one or more sequential allocation techniques, without departing from the spirit of the disclosure.

At step 308, the one or more first values of the one or more input parameters are presented to the requester within the graphical plot. In an embodiment, the micro-processor 202 is configured to present the one or more first values to the requester through the GUI of the requester-computing device 108. In an embodiment, the one or more first values are presented within a Pareto Front Plot when a dimension of the objective function is less than or equal to three. Further, when the dimension of the objective function is greater than three, the one or more first values are presented in a Parallel Coordinates Plot. In an embodiment, the micro-processor 202 may utilize the comparator 208 to compare the value of the dimension of the objective function with the number three. Based on the result of the comparison, the micro-processor 202 may determine whether to present the one or more first values to the requester in a Pareto Front Plot (i.e., when the dimension is less than or equal to three) or in a Parallel Coordinates Plot (i.e., when the dimension is greater than three). In an embodiment, the dimension of the objective function corresponds to the number of variables being optimized. For example, the objective function J(x) represented in equation (1) has a dimension of three, and hence, the one or more first values in this scenario may be presented in a Pareto Front Plot. The following is an example of an objective function J'(x) having a dimension of five:

$$\text{Find } x^* = (\text{incentive, video speed, country,} \quad (4)$$
$$\text{lifetime of task, assignment duration) such that } J'(x) =$$

$$\left[ \text{mean}(\ln \text{ accuracy})), \frac{1}{std(\ln (\text{accuracy}))}, \text{acceptance rate}, \frac{1}{\text{mean}(\ln(\text{completion time}))}, \frac{1}{std(\ln(\text{completion time}))} \right]$$

is maximized

As illustrated in the above equation, the objective function J'(x) has a dimension of five as it requires a maximization of five constraints such as mean of lognormal distribution of accuracy, inverse of standard deviation of lognormal distribution of accuracy, acceptance rate, inverse of mean of lognormal distribution of completion time, and inverse of lognormal distribution of completion time. A person skilled in the art would appreciate that the maximization of inverse of standard deviation of lognormal distribution of a parameter is indicative of a minimization of a spread of the lognormal distribution of the respective parameter. For example, if the dimension of the objective function is five (which is greater than three), the one or more first values may be presented in a Parallel Coordinates Plot to the requester.

Figure 4E:
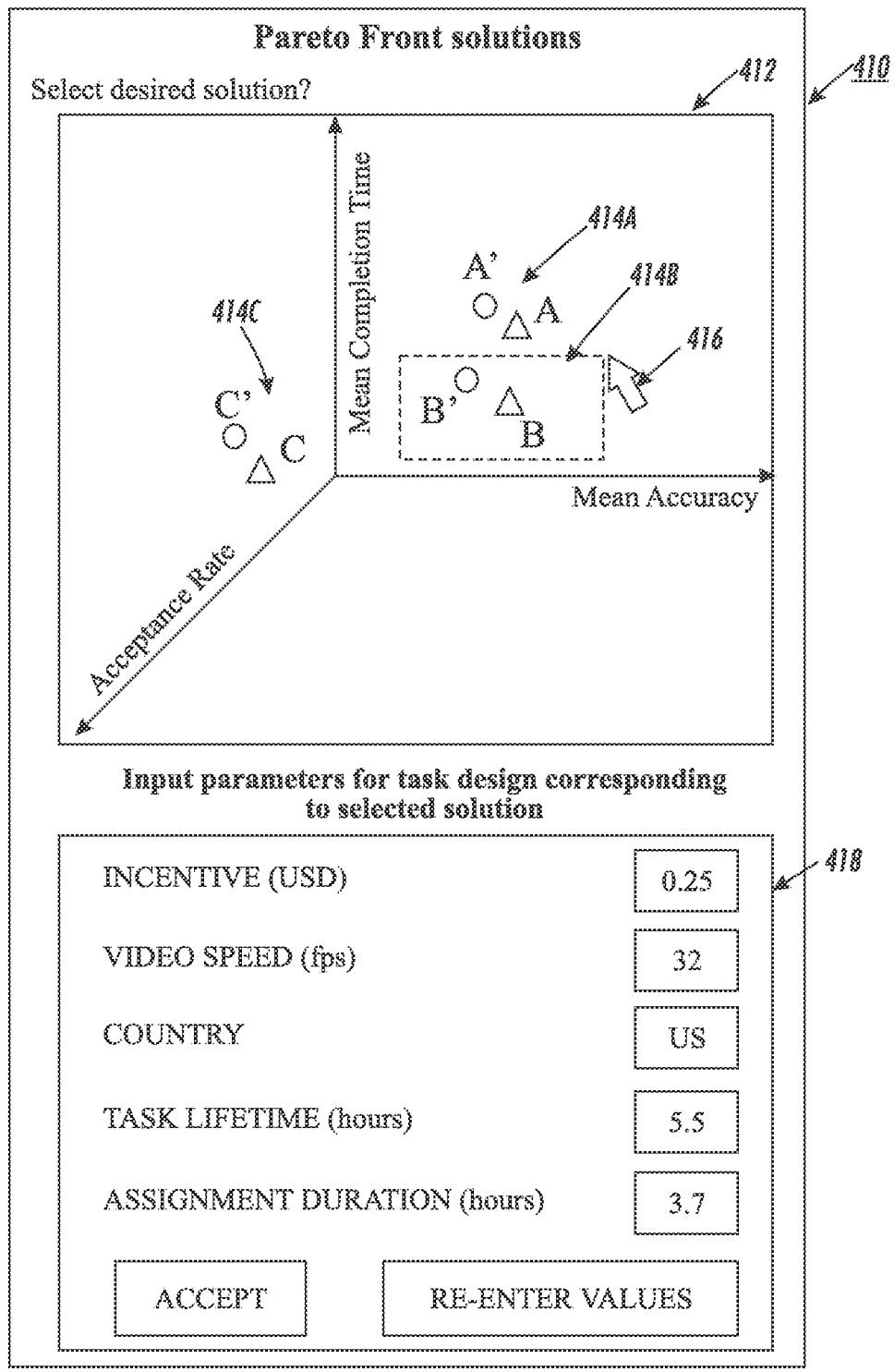
Figure 4F:
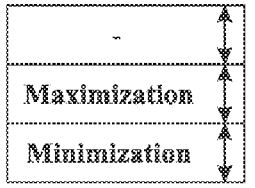
Figure 4G:
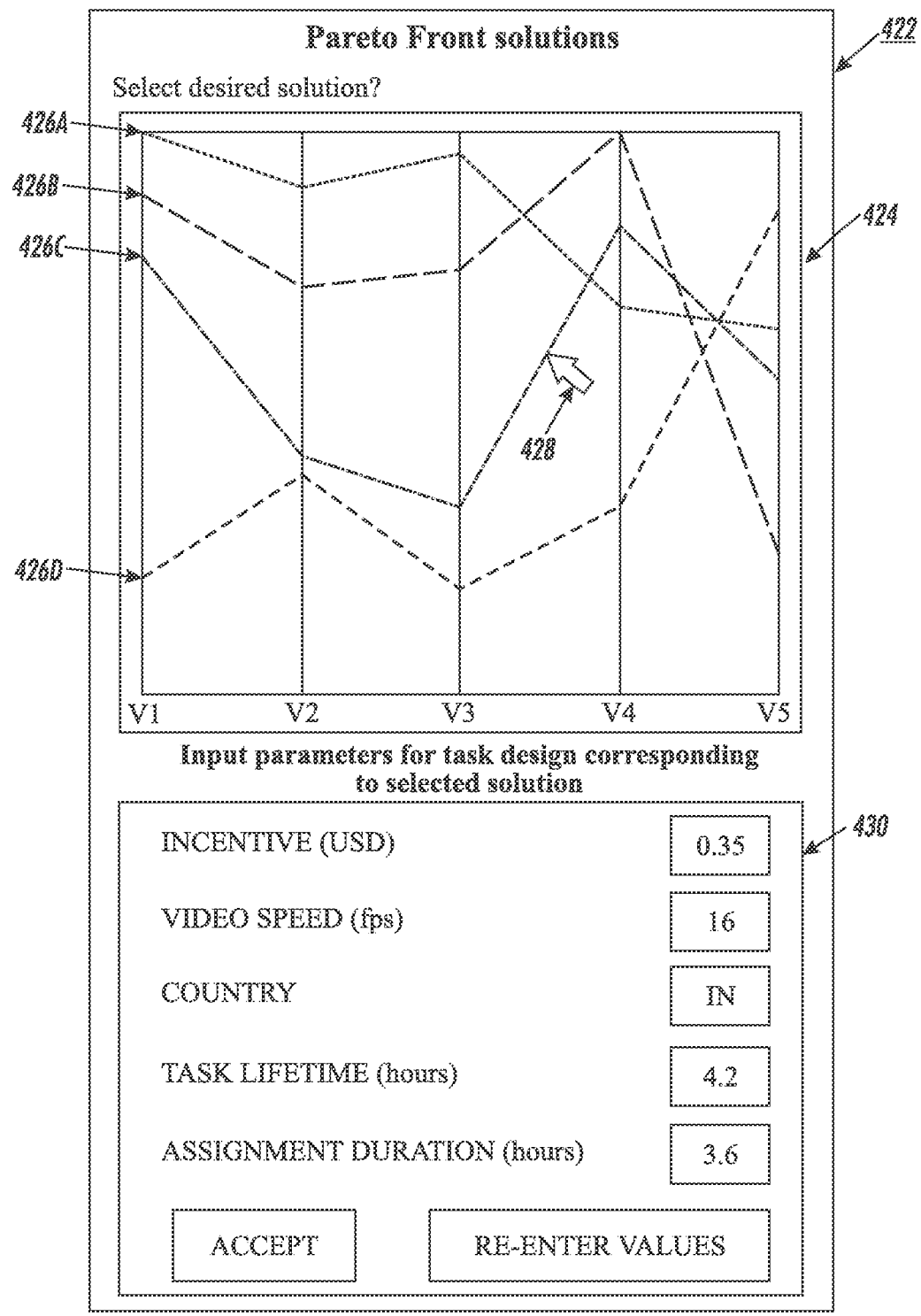

An example of a UI with a Pareto Front Plot has been illustrated in FIG. 4E, while an example of a UI with a Parallel Coordinates Plot has been illustrated in FIG. 4G. Further, FIG. 4C illustrates a UI with a recommendation of the one or more first values of the one or more input parameters that may be presented to the requester.

At step 310, a check is performed to determine whether the one or more first values are acceptable to the requester based on an input received from the requester through the requester-computing device 108. In an embodiment, the micro-processor 202 performs the check. Based on the check, if it is determined that the requester accepts the one or more first values through the requester-computing device 108, step 314 is performed. Otherwise, step 312 is performed.

At step 312, the one or more second target values for the one or more output parameters are received from the requester. In an embodiment, the micro-processor 202 is configured to receive the one or more second target values from the requester. In an embodiment, the requester may provide the one or more second target values through the user-interface of the requester-computing device 108. Thereafter, steps 306 to 310 are performed based on the one or more second target values instead of the one or more first target values, in a similar manner.

In an embodiment, in addition to providing the one or more second target values, the requester may opt for updating the model by the micro-processor 202. To that end, the requester may provide another budget constraint for a fresh set of observations. This budget constraint may be deterministic of the number and the combination of a fresh set of input parameters to be considered for observing values of the output parameters. Thus, the total number of fresh observations of the output parameters for all combinations of the input parameters may be limited by the budget constraint. In an embodiment, multiple values of the output parameters may be observed for the various combinations of the fresh set of input parameters based on the budget constraint. For example, the requester provides a value of five for the budget constraint and there are two combinations of input parameters. In such a scenario, the micro-processor 202 may record three observations of output parameters for the first combination and two observations of output parameters for the second combination, or vice versa, as explained in step 302. Thereafter, in an embodiment, the model may be updated.

At step 314, the one or more tasks are submitted for crowdsourcing based on the one or more first values of the one or more input parameters. In an embodiment, the micro-processor 202 is configured to submit the one or more tasks on the crowdsourcing platform, for example, 104a, with the task design being governed by the one or more first values of the one or more input parameters, as selected by the requester.

FIGS. 4A, 4B, 4C, 4D, 4E, 4F, and 4G illustrate examples of the user interfaces (UIs) presented on the requester-computing device 108 for designing of the one or more tasks for crowdsourcing, in accordance with at least one embodiment.

FIG. 4A illustrates a UI (denoted by 402) that may be presented to the requester on the requester-computing device 108 to receive the one or more first target values of the one or more output parameters. As shown in FIG. 4A, through the UI 402, the requester may select the output parameters "task accuracy" and "task completion time" for maximization and minimization respectively. Further, the requester may provide first target values for the selected output parameters. For instance, as illustrated in FIG. 4A, the requester provides the values 0.85 and 525 seconds for the output parameters "task accuracy" and "task completion time," respectively.

FIG. 4B illustrates a UI (denoted by 404) that may be presented to the requester on the requester-computing device 108 to receive inputs pertaining to the output parameters that need to be optimized. The UI 404 corresponds to the scenario in which the requester may not specify the one or more first target values of the one or more output parameters. Instead, the requester may select the output parameters to be maximized and the output parameters to be minimized. For instance, as shown in FIG. 4B, the requester may select the output parameters "task accuracy" and "task acceptance rate" for "maximization" and the output parameter "task completion time" for "minimization". Based on the model, the one or more first target values of the one or more output parameters, so selected, may be determined, as explained in step 304 (FIG. 3).

FIG. 4C illustrates a UI (denoted by 406) that may be presented to the requester on the requester-computing device 108 to display the one or more first values of the input parameters. For instance, as shown in FIG. 4C, the requester is displayed recommended values of the input parameters such as task incentive (USD 0.15), video speed (16 fps), country in which the task may be posted (US), lifetime of task (3.5 hours), and assignment duration of task (1.7 hours). The requester may accept such recommended input parameters for crowdsourcing of the one or more tasks. When such input parameters are used for crowdsourcing of the one or more tasks, the output parameters (e.g., task accuracy, task completion time, task acceptance rate) obtained may be close to the one or more first target values.

FIG. 4D illustrates a UI (denoted by 408) that may be presented to the requester on the requester-computing device 108 to receive the one or more first target values of the one or more output parameters. Through the UI 408, the requester may select the output parameters to be optimized and specify an optimization target for each selected output parameter. Further, the requester may specify a target value and an optimization direction for each optimization target of the respective output parameters, so selected. For instance, as shown in FIG. 4D, the requester selects the output parameters "task accuracy", "task completion time", and "task acceptance rate", and subsequently provides "mean", "mean", and "value" respectively as the optimization targets and "maximization", "minimization", and "maximization" respectively as the optimization directions. Thus, in the current scenario, the means of the distributions of the output parameters "task accuracy" and "task completion time" may be maximized and minimized respectively, while the value of the output parameter "task acceptance rate" may be maximized. Further, the requester specifies target values of 0.90 (for task accuracy), 652 seconds (for task completion time), and 0.78 (for task acceptance rate) for the one or more output parameters. Thus, the optimization may be subject to the target values of the output parameters, so specified by the requester. Through the UI 408, the requester may opt to view a graphical plot of optimized output parameters and corresponding recommended input parameters. If the requester does not opt to view the graphical plot, the requester may be presented with the UI 406, as illustrated in FIG. 4C. Alternatively, if the requester chooses to view the graphical plot, the requester may be presented a UI such as that depicted in FIG. 4E (denoted by 410) or FIG. 4G (denoted by 422). The UI 410 (depicted in FIG. 4E) may be presented to the requester when the number of optimization targets specified by the requester is less than or equal to three, such as in the current scenario of the UI 408. However, the requester may be presented with the UI 422 (depicted in FIG. 4G) when the number of optimization targets is more than three (as in the case of illustrated in FIG. 4F).

FIG. 4E illustrates the UI 410 that may be presented to the requester on the requester-computing device 108 to display a Pareto Front graphical plot of output parameters and a corresponding recommendation of input parameters to design the one or more tasks for crowdsourcing. As illustrated in FIG. 4E, the graphical plot corresponding to the Pareto Front solutions of output parameters is shown in region 412. FIG. 4E shows a scenario in which the requester provides three sets of one or more first target values through the UI 408. The requester may provide each such set of the one or more first target values iteratively. For example, the requester enters a first set of one or more first target values through the UI 408. Thereafter, the requester may be presented with the UI 410 that displays the first set of one or more first target values (represented by point A') and a first Pareto Front solution of the output parameters (represented by point A) within a Pareto Front graphical plot. The requester may also be displayed the input parameters corresponding to the first Pareto Front solution (within the region 418). If the requester does not accept the current solution, the requester may choose to re-enter values, and subsequently, the requester may again be presented the UI 408. The requester may then provide a second set of one or more first target values through the UI 408. Further, in a similar manner, through the UI 410, the requester may be displayed the previously entered first target values A' and the previous Pareto Front solution A (collectively depicted by 414a) along with current set of one or more first target values B' and corresponding Pareto Front solution B (collectively depicted by 414b), and so on.

Within the graphical plot, points A', B', and C' represent the three sets of one or more first target values provided by the requester that are represented along the axes of "mean task accuracy", "mean completion time", and "task acceptance rate". Further, points A, B, and C represent the Pareto Front solutions corresponding to the three sets of one or more first target values A', B', and C', respectively, within the same coordinate system. The one or more first target values and the respective solutions are collectively denoted by 414a (A', A), 414b (B', B), and 414c (C', C). The requester may choose to view the one or more input parameters corresponding to a particular Pareto Front solution. To view the one or more input parameters associated with a desired solution, the requester may select a region that includes the point corresponding to the desired solution. For instance, as shown in FIG. 4E, the requester selects the points B' and B using a pointer (depicted by 416). The input parameters corresponding to the selected solution (represented by point B) in the current scenario are displayed within the region 418. For instance, the input parameters of the currently selected solution (represented by the point B) are USD 0.25 for task incentive, 32 fps for video speed, US for country of task posting, 5.5 hours for lifetime of task, and 3.7 hours for duration of task assignment. The requester may accept this or any other solution represented within the UI 410. Alternatively, the requester may wish to re-enter values of the one or more first target values (referred as one or more second target values). If the requester so wishes, the requester may again be presented with the UI 408.

FIG. 4F illustrates a UI 420 that may be presented to the requester on the requester-computing device 108 to receive the one or more first target values of the one or more output parameters. The UI 420 is similar to the UI 408 (illustrated in FIG. 4D) with different inputs being received from the requester. As shown in FIG. 4F, the requester provides optimization targets of maximizing mean of task accuracy, minimizing standard deviation (SD) of task accuracy, minimizing mean and standard deviation (SD) of task completion time, and maximizing value of the task acceptance rate. Further, the requester may provide target values for the various optimization targets. For instance, the requester provides the values 0.85 and 0.15 for mean and SD of task accuracy, 550 seconds and 75 seconds for mean and SD of task completion time, and 0.72 for task acceptance rate. Further, the requester may also opt to be presented with a graphical plot of the optimization solution, as is the case in the current scenario. As the number of optimization targets is more than three, the graphical plot presented to the requester may correspond to a Parallel Coordinates Plot, as illustrated in FIG. 4G.

FIG. 4G illustrates the UI 422 that may be presented to the requester on the requester-computing device 108 to display a Parallel Coordinates graphical plot of Pareto Front solutions of output parameters and input parameters corresponding to a selected solution. As shown in FIG. 4G, a region 424 illustrates four Pareto Front solutions (depicted by lines 426a, 426b, 426c, and 426d) within a Parallel coordinate system of five dimensions V1, V2, V3, V4, and V5. The five dimensions may correspond to five optimization targets; for instance, mean of task accuracy (V1), SD of task accuracy (V2), mean of task completion time (V3), SD of task completion time (V4), and task acceptance rate (V5). The requester may select one of the lines within the region 424 to view the input parameters corresponding to the solution represented by that line. For instance, the requester selects the line 426c using a pointer (depicted by 428). The corresponding values of the input parameters may be presented to the requester within a region 430. For instance, the input parameters corresponding to the selected solution (represented by line 426c) include task incentive as 0.35 USD, video speed as 16 fps, country of posting tasks as India, lifetime of tasks as 4.2 hours, and duration of assignment of tasks as 3.6 hours. The requester may choose to accept one of the solutions. Alternatively, the requester may choose to re-enter the optimization targets, target values, and optimization direction of the various output parameters through the UI 420.

A person skilled in the art would appreciate that the user interfaces (depicted by 402, 404, 406, 408, 410, 420, 422) are for the purpose of illustrative examples. The scope of the disclosure is not limited to such user interfaces. The disclosure may be implemented through other similar/dissimilar user interfaces.

Further, a person skilled in the art would appreciate that the scope of the disclosure is not limited to the one or more tasks being video/image analysis/tagging tasks. In an embodiment, the one or more tasks may include, but are not limited to, text labelling/tagging/categorization, language translation, data entry, handwriting recognition, product description writing, product review writing, essay writing, address look-up, website look-up, hyperlink testing, survey completion, consumer feedback, identifying/removing vulgar/illegal content, duplicate checking, problem solving, user testing, video/audio transcription, targeted photography (e.g., of product placement), text/image analysis, directory compilation, or information search/retrieval.

Various embodiments of the disclosure encompass numerous advantages including iterative recommendations of input parameters for optimum task design. As discussed above, the requester may provide various target values of output parameters. Using multi-objective optimization techniques such as Pareto Optimization, optimal solutions of input parameters and corresponding output parameters may be determined. Further, the solutions that are close to the target values may be presented to the requester along with the recommended input parameters corresponding to the solutions. The disclosure provides for graphical presentation of the solutions in a Pareto Plot or a Parallel Coordinates Plot depending on the number of optimization targets. Further, the solutions may be iteratively refined when the requester provides fresh sets of target values. The process repeats with a fresh set of solutions being presented along with the previous solutions. The requester may continue until desired target values of output parameters are achieved through the solutions. Thereafter, the tasks may be crowd-sourced based on the input parameters corresponding to a solution selected by the requester. The tasks crowdsourced in such a manner may have desirable performance characteristics.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic". Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for designing one or more tasks for crowdsourcing have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. An image-analysis task system, the system comprising:
    an application server comprising one or more microprocessors;
    a requester computing device comprising a display device configured to display a Graphical User Interface (GUI);
    a worker computing device of one or more crowdworkers; and
    a network configured for communication of the requester computing device and the worker computing device with the application server; wherein:
    the application server is configured to generate the GUI that displays output parameters including a task accuracy, a task completion time, and a task acceptance rate associated with an image-analysis task on the display device;
    the application server is configured to receive first target values of the output parameters associated with the image-analysis task through the GUI, wherein the first target values include values for the task accuracy, the task completion time, and the task acceptance rate;
    the application server is configured to determine first values of input parameters associated with performing the image-analysis task by performing an optimization process that is based on maximizing a mean value of a lognormal of the task accuracy, maximizing an inverse of a mean value of a lognormal of the task completion time, and maximizing the task acceptance rate associated with the image-analysis task, based at least on the first target values and a model, wherein the model corresponds to a relationship between the input parameters and the output parameters;
    the display is configured to display, through the GUI, a plurality of first solutions of the optimization process and the first values of the input parameters associated with the plurality of first solutions;
    the application server is configured to receive, through the GUI, second target values of the output parameters, the second target values replacing the first target values;
    the application server is configured to determine second values of the input parameters by performing the optimization process based on the model and the second target values;
    the display is configured to display, to a requester through the GUI, a plurality of second solutions of the optimization process and the second values of the input parameters associated with the plurality of second solutions;
    the application server is configured to receive, through the GUI, a first input selecting a second solution from the plurality of second solutions and a second input accepting the second values of the input parameters; and
    the application server is configured to transmit the image-analysis task and the second values of the input parameters to the worker computing device to enable the one or more crowdworkers to perform the image-analysis task according to the second values of the input parameters.

2. The system of claim 1, wherein the input parameters correspond to at least one of a task-incentive associated with the image-analysis task, a playback speed associated with the image-analysis task, a country in which the image-analysis task is posted, a lifetime of the image-analysis task, time available to complete the image-analysis task, days of a week on which the image-analysis task is attempted, a time of day when the image-analysis task is attempted, a recurrence of the image-analysis task, skill set associated with a crowdworker, availability of the crowdworker to perform the image-analysis task, motivation of the crowdworker in performing the image-analysis task, intentions of the crowdworker in performing the image-analysis task, and difficulty level of the image-analysis task.

3. The system of claim 1, wherein the first values are presented in a graphical plot through the GUI, wherein the graphical plot corresponds to at least one of a Pareto Front plot or a Parallel co-ordinates plot.

4. An image-analysis task system, the system comprising:
    an application server comprising one or more microprocessors;
    a requester computing device comprising a display device configured to display a Graphical User Interface (GUI);
    a worker computing device; and
    a network configured for communication of the requester computing device and the worker computing device with the application server; wherein:
    the application server is configured to generate the GUI that displays output parameters including a task accuracy, a task completion time, and a task acceptance rate associated with an image-analysis task on the display device;
    the application server is configured to receive, through the Graphical User Interface (GUI), first target values of the output parameters associated with the image-analysis task, wherein the first target values include values for the task accuracy, the task completion time, and the task acceptance rate;
    the application server is configured to determine first values of input parameters associated with performing the image-analysis task by performing an optimization process that is based on maximizing a mean value of a lognormal of the task accuracy, maximizing an inverse of a mean value of a lognormal of the task completion time, and maximizing the task acceptance rate associated with the image-analysis task, based at least on the first target values and a model, wherein the model corresponds to a relationship between the input parameters and the output parameters;
    the application server is configured to present through the GUI, a plurality of first solutions of the optimization process and the first values of the input parameters associated with the plurality of first solutions;
    the application server is configured to receive, through the GUI, second target values of the output parameters, the second target values replacing the first target values;

the application server is configured to determine second values of the input parameters by performing the optimization process based on the model and the second target values;

the application server is configured to present through the GUI, a plurality of second solutions of the optimization process and the second values of the input parameters associated with the plurality of second solutions;

the application server is configured to receive, through the GUI, a first input selecting a second solution from the plurality of second solutions and a second input accepting the second values of the input parameters; and the application server is configured to transmit the image-analysis task and the second values of the input parameters to the worker computing device of one or more crowdworkers to enable the one or more crowdworkers to perform the image-analysis task according to the second values of the input parameters, wherein the first values of the input parameters are determined based at least on the first target values and the model, the second values of the input parameters are determined based at least on the second target values and the model, and the image-analysis task relates to at least one of image labelling, image tagging, image categorisation, video labelling, video tagging, video categorisation, handwriting recognition, identifying vulgar content, removing vulgar content, identifying illegal content, removing illegal content, duplicate checking, video transcription, and targeted photography of product placement.

5. The system of claim 4, wherein the model corresponds to at least one of a statistical model or a deterministic model.

6. The system of claim 4, wherein the first values are presented in a graphical plot through the GUI, wherein the graphical plot corresponds to at least one of a Pareto Front plot or a Parallel co-ordinates plot.

7. The system of claim 4, wherein the input parameters correspond to at least one of a task-incentive associated with the image-analysis task, a playback speed associated with the image-analysis task, a country in which the image-analysis task is posted, a lifetime of the image-analysis task, time available to complete the image-analysis task, days of a week on which the image-analysis task is attempted, a time of day when the image-analysis task is attempted, a recurrence of the image-analysis task, skill set associated with a crowdworker, availability of the crowdworker to perform the image-analysis task, motivation of the crowdworker in performing the image-analysis task, intentions of the crowdworker in performing the image-analysis task, and difficulty level of the image-analysis task.

8. A method for operating an image-analysis task system, the method comprising:

generating, using an application server comprising one or more microprocessors, a Graphical User Interface (GUI) displaying output parameters including a task accuracy, a task completion time, and a task acceptance rate associated with the image-analysis task on a display device of a requester computing device;

receiving, using the application server, first target values of the output parameters associated with the image-analysis task through the GUI, wherein the first target values include values for the task accuracy, the task completion time, and the task acceptance rate;

determining, using the application server, first values of input parameters associated with performing the image-analysis task by performing an optimization process that is based on maximizing a mean value of a lognormal of the task accuracy, maximizing an inverse of a mean value of a lognormal of the task completion time, and maximizing the task acceptance rate associated with the image-analysis task, based at least on the first target values and a model, wherein the model corresponds to a relationship between the input parameters and the output parameters;

displaying, through the GUI, a plurality of first solutions of the optimization process and the first values of the input parameters associated with the plurality of first solutions;

receiving by the application server, through the GUI, second target values of the output parameters, the second target values replacing the first target values;

determining, using the application server, second values of the input parameters by performing the optimization process based on the model and the second target values;

displaying through the GUI, a plurality of second solutions of the optimization process and the second values of the input parameters associated with the plurality of second solutions;

receiving by the application server, through the GUI, a first input selecting a second solution from the plurality of second solutions and a second input accepting the second values of the input parameters; and transmitting, using the application server, the image-analysis task and the second values of the input parameters to a worker computing device of one or more crowdworkers to enable the one or more crowdworkers to perform the image-analysis task according to the second values of the input parameters, the transmission occurring through a network configured for communication of the requester computing device and the worker computing device with the application server.

9. The method of claim 8, wherein the input parameters correspond to at least one of a task-incentive associated with the image-analysis task, a playback speed associated with the image-analysis task, a country in which the image-analysis task is posted, a lifetime of the image-analysis task, time available to complete the image-analysis task, days of a week on which the image-analysis task is attempted, a time of day when the image-analysis task is attempted, a recurrence of the image-analysis task, skill set associated with a crowdworker, availability of the crowdworker to perform the image-analysis task, motivation of the crowdworker in performing the image-analysis task, intentions of the crowdworker in performing the image-analysis task, and difficulty level of the image-analysis task.

10. The method of claim 8, wherein the model corresponds to at least one of a statistical model or a deterministic model.

11. The method of claim 8, wherein the first values are presented in a graphical plot through the GUI, wherein the graphical plot corresponds to at least one of a Pareto Front plot or a Parallel co-ordinates plot.

12. The method of claim 8, wherein the first values are determined by utilizing one or more machine learning techniques comprising at least one of one or more active learning techniques, one or more reinforcement learning techniques, or one or more sequential allocation techniques.

13. The method of claim 8 further comprising receiving, using the application server, at least one budget constraint associated with a number and a combination of the input parameters.

14. A method for operating one or more image-analysis tasks, the method comprising:

generating, using an application server comprising one or more microprocessors, a Graphical User Interface (GUI) displaying output parameters including a task accuracy, a task completion time, and a task acceptance rate associated with the one or more image-analysis tasks on a display device of a requester computing device;

receiving, using the application server, first target values of the output parameters associated with the one or more image-analysis tasks from the requester computing device through the GUI, wherein the first target values include values for the task accuracy, the task completion time, and the task acceptance rate;

determining, using the application server, first values of input parameters associated with performing the one or more image-analysis tasks by performing an optimization process that is based on maximizing a mean value of a lognormal of the task accuracy, maximizing an inverse of a mean value of a lognormal of the task completion time, and maximizing the task acceptance rate associated with the one or more image-analysis tasks, based at least on the first target values and a model, wherein the model corresponds to a relationship between the input parameters associated with the one or more image-analysis tasks and the output parameters;

displaying, through the GUI, a plurality of first solutions of the optimization process and the first values of the input parameters within a graphical plot, wherein the graphical plot corresponds to at least one of a Pareto Front plot or a Parallel co-ordinates plot;

receiving, through the GUI, second target values for the output parameters, the second target values replacing the first target values;

determining, using the application server, second values of the input parameters by performing the optimization process based on the model and the second target values;

displaying, through the GUI, a plurality of second solutions of the optimization process and the second values of the input parameters associated with the plurality of second solutions;

receiving, through the GUI, a first input from a requester selecting a second solution from the plurality of second solutions and a second input from the requester accepting the second values of the input parameters; and transmitting, using the application server, the one or more image-analysis tasks and the second values of the input parameters to a worker computing device of one or more crowdworkers to enable the one or more crowdworkers to perform the one or more image-analysis tasks according to the second values of the input parameters, and the one or more image-analysis tasks relate to at least one of image labelling, image tagging, image categorisation, video labelling, video tagging, video categorisation, handwriting recognition, identifying vulgar content, removing vulgar content, identifying illegal content, removing illegal content, duplicate checking, video transcription, and targeted photography of product placement, wherein the transmission occurs through a network configured for communication of the requester computing device and the worker computing device with the application server.

15. The method of claim 14, wherein the model is updated based on a performance of the one or more image-analysis tasks on a crowdsourcing platform.

16. The method of claim 14, wherein the model corresponds to at least one of a statistical model or a deterministic model.

17. The method of claim 14, wherein the first values are determined by utilizing one or more machine learning techniques comprising at least one of one or more active learning techniques, one or more reinforcement learning techniques, or one or more sequential allocation techniques.

18. The method of claim 14 further comprising receiving, by the application server, at least one budget constraint associated with a number and a combination of the input parameters.

19. A computer program product for use with an image-analysis system, the computer program product comprising a non-transitory computer readable medium, wherein the non-transitory computer readable medium stores a computer program code for designing an image-analysis task for crowdsourcing, wherein the computer program code is executable by one or more micro-processors on an application server to:

generate a Graphical User Interface (GUI) that displays output parameters including a task accuracy, a task completion time, and a task acceptance rate associated with the image-analysis task on a display device of a requester computing device;

receive first target values of the output parameters associated with the image-analysis task from the requester computing device through the GUI, wherein the first target values include values for the task accuracy, the task completion time, and the task acceptance rate;

determine first values of input parameters associated with performing the image-analysis task by performing an optimization process that is based on maximizing a mean value of a lognormal of the task accuracy, maximizing an inverse of a mean value of a lognormal of the task completion time, and maximizing the task acceptance rate associated with the image-analysis task, based at least on the first target values and a model, wherein the model corresponds to a relationship between the input parameters and the output parameters;

display, through the GUI, a plurality of first solutions of the optimization process and the first values of the input parameters associated with the plurality of first solutions;

receive, through the GUI, second target values of the output parameters, the second target values replacing the first target values;

determine second values of the input parameters by performing the optimization process based on the model and the second target values;

display, through the GUI, a plurality of second solutions of the optimization process and the second values of the input parameters associated with the plurality of second solutions;

receive, through the GUI, a first input selecting a second solution from the plurality of second solutions and a second input accepting the second values of the input parameters; and transmit the image-analysis task and the second values of the input parameters to a worker computing device of one or more crowdworkers to enable the one or more crowdworkers to perform the image-analysis task according to the second values of the input parameters, the transmission occurring through a network configured for communication of the requester computing device and the worker computing device with the application server.

20. A computer program product for use with an image-analysis system,
the computer program product comprising a non-transitory computer readable medium, wherein the non-transitory computer readable medium stores a computer program code for designing one or more image-analysis tasks for crowdsourcing, wherein the computer program code is executable by one or more microprocessors on an application server to:
generate a Graphical User Interface (GUI) that displays output parameters including a task accuracy, a task completion time, and a task acceptance rate associated with the one or more image-analysis tasks on a display device of a requester computing device;
receive through the GUI, first target values of the output parameters associated with the one or more image-analysis tasks, wherein the first target values include values for the task accuracy, the task completion time, and the task acceptance rate;
determine first values of input parameters associated with performing the one or more image-analysis tasks by performing an optimization process that is based on maximizing a mean value of a lognormal of the task accuracy, maximizing an inverse of a mean value of a lognormal of the task completion time, and maximizing the task acceptance rate, the optimization process is performed based on the first target values and a model representing a relationship between the input parameters and the output parameters;
present, through the GUI, a plurality of first solutions of the optimization process and the first values of the input parameters associated with the plurality of first solutions;
receive, through the GUI, second target values of the output parameters, the second target values replacing the first target values;
determine second values of the input parameters by performing the optimization process based on the model and the second target values;
present, through the GUI, a plurality of second solutions of the optimization process and the second values of the input parameters associated with the plurality of second solutions;
receive, through the GUI, a first input selecting a second solution from the plurality of second solutions and a second input accepting the second values of the input parameters; and
transmit the one or more image-analysis tasks and the second values of the input parameters to a worker computing device of one or more crowdworkers to enable the one or more crowdworkers to perform the one or more image-analysis tasks according to the second values of the input parameters,
wherein the first values of the input parameters are determined based at least on the first target values and the model, the second values of the input parameters are determined based on the second target values and the model, and the image-analysis task relates to at least one of image labelling, image tagging, image categorisation, video labelling, video tagging, video categorisation, handwriting recognition, identifying vulgar content, removing vulgar content, identifying illegal content, removing illegal content, duplicate checking, video transcription, and targeted photography of product placement, wherein the transmission occurs through a network configured for communication of the requester computing device and the worker computing device with the application server.

* * * * *